Feb. 19, 1957  J. R. HOFFHINES ET AL  2,781,606
MEANS FOR CARRYING AND DRYING ARTIFICIAL FLIES
Filed Dec. 15, 1953
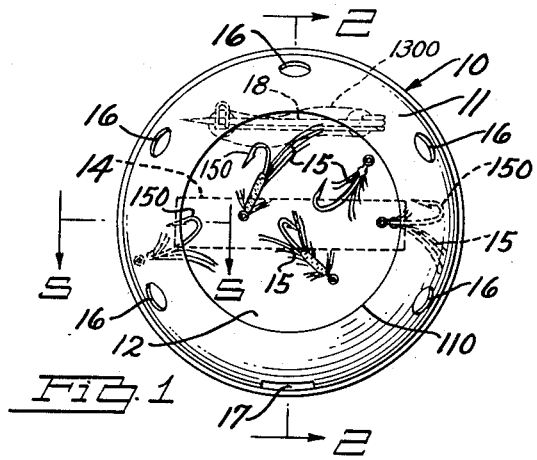
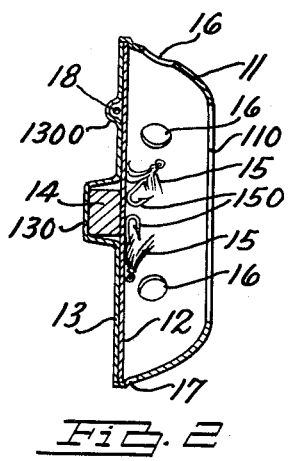
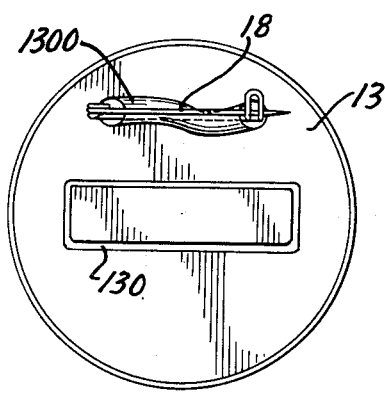
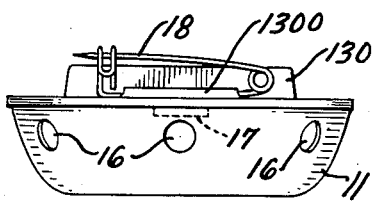
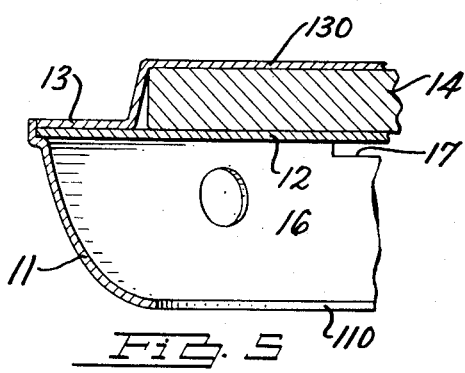
INVENTOR.
JAMES R. HOFFHINES &
BY CHARLES C. THOMAS
Everett F. Wright
ATTORNEY

United States Patent Office 2,781,606
Patented Feb. 19, 1957

2,781,606

MEANS FOR CARRYING AND DRYING ARTIFICIAL FLIES

James R. Hoffhines and Charles C. Thomas, Detroit, Mich., assignors to Plasti-Print, Incorporated, a corporation of Michigan Application December 15, 1953, Serial No. 398,366

3 Claims. (Cl. 43—57.5)

This invention relates to a container for carrying and drying artificial flies used for bait in fly fishing.

Dry fly fishermen invariably carry an assortment of several types of artificial flies, and while fishing they frequently change from one artificial fly to another in an effort to find which fly is the most effective in a particular fishing situation. Also, dry flies get wet during use and, as a result, they become ineffective whereupon they must be removed from the fish line and stored for drying. It is extremely desirable for a dry fly fisherman to be able to change flies with a minimum loss of time, therefore, ready access to an assortment of thoroughly dried flies is essential.

One object of the invention is to provide a simple, effective and inexpensive means for carrying and air drying artificial flies in which the flies are readily available to the fisherman at all times.

Another object of the invention is to provide a container attachable to the outer clothing of a fisherman for carrying and air drying artificial flies from which a dry fly may be withdrawn and a wet fly deposited by the fisherman with one hand, leaving the other hand free for other uses in the fly changing operation.

Another object of the invention is to provide a container including means for attaching it to the outer clothing of a fisherman in which artificial flies may be deposited, dried and carried in such a manner that the flies are readily available to the fisherman for immediate selection and removal whenever he deems it necessary or desirable to change flies when fly fishing.

Another object of the invention is to provide an open container for receiving, carrying and drying artificial flies into which flies may be deposited and withdrawn by the fisherman with one hand and which protects the flies at all times from being lost or blown away.

A further object of the invention is to provide a vented artificial fly container having an opening through which flies may be deposited and withdrawn including means for retaining the flies therein readily accessible through said opening.

Other objects of the invention will become apparent by reference to the following detailed description taken in connection with the accompanying drawing, in which:

Fig. 1 is a front elevational view of an artificial fly container embodying the invention.

Fig. 2 is a vertical sectional view taken on the line 2—2 of Fig. 1.

Fig. 3 is a rear elevational view.

Fig. 4 is a top plan view.

Fig. 5 is an enlarged fragmentary horizontal sectional view taken on the line 5—5 of Fig. 1.

Referring now to the drawing wherein like reference numerals refer to like and corresponding parts throughout the several views, the illustrative embodiment of the invention disclosed therein comprises an open front container 10 constructed of a plastic or other suitable material which is composed of a front dome element 11 centrally apertured at 110, a face element 12 disposed at the base of said front dome element 11 and a back 13 which is formed with a well at 130 to accommodate a permanent magnet 14 preferably horizontally disposed and located opposite the central aperture 110. The several parts of the container 10 are secured together in any suitable manner.

The central aperture 110 in the front dome element 11 is of sufficient size to permit a fisherman to deposit artificial flies into and withdraw them from the container 10, and the permanent magnet 14 is of such strength as to firmly but removably retain in the container 10 artificial flies 15 against the face element 12, each fly 15 having a megnetically attractable hook 150. This construction assures that the artificial flies 15 will be retained in the container centrally in respect to the aperture 110 of the dome element 11 ready for instant selection and removal.

The front centrally apertured dome element 11 is preferably transparent and is provided with a plurality of vent apertures 16 and a drain aperture 17 therein. The drain aperture 17 is located centrally at the bottom of the front centrally apertured dome 11 adjacent the face 12, and the vent apertures 16 are suitably located and spaced around the periphery of the centrally apertured dome 11 to permit the circulation of air around the artificial flies 15 for drying them.

The back 13 is suitably formed to provide an S-shaped sleeve at 1300 to accommodate a safety pin 18 by means of which the open front artificial fly container 10 may be attached to the sleeve, shirt front, hat or other outer clothing of a fisherman. By making the sleeve 1300 S-shaped, the safety pin 18 is not rigidly fixed in the sleeve 1300, and, as a result, the container 10 may be readily pinned onto the apparel of a fisherman without breakage of the back 13 thereof. Obviously, other means for securing the artificial fly container to the fisherman's person, clothing or other equipment may be employed.

Artificial fly containers embodying the invention receive and retain an assortment of artificial flies therein readily accessible to the fisherman for selection and removal, and, when placed therein, wet flies dry quickly as a result of air currents passing therethrough. The use of a transparent centrally apertured front dome is of considerable aid to the fisherman when selecting the particular artificial fly he desires to withdraw from the container.

Although but a single embodiment of the invention has been disclosed and described in detail, it is obvious that many changes may be made in the size, shape, arrangement and construction of the several elements of the invention as well as in overall shape and proportions thereof, all within the scope of the invention as defined by the appended claims.

We claim:

1. A storage and drying container for magnetically attractable artificial flies comprising a back element having a well formed therein, a permanent magnet in said well, a face element disposed over said back element retaining said magnet in said well, and a front dome element apertured opposite said magnet through which artificial flies may be placed in said container, said magnet maintaining said artificial flies readily accessible for selection and removal, the said front dome being transparent and having a plurality of vent apertures therearound and a drain aperture at the bottom thereof, and means for securing said container to apparel of a fisherman with the drain aperture downwardly disposed.

2. A storage and drying carrier for magnetically attractable artificial flies comprising a container including a back and a shallow domed shaped front, the said dome shaped front having a central uncovered aperture therein through which flies may be placed into and retrieved from said container, a permanent magnet at the back of said container having its major portion disposed opposite the central aperture in said dome shaped front, the said magnet maintaining said artificial flies placed in said container through said central aperture readily accessible for selection and removal therefrom, the sides of said dome shaped front having a plurality of vent apertures therein, and means for securing the said container to apparel of a fisherman with the front thereof outward disposed.

3. A storage and drying carrier as claimed in claim 2, wherein one of the vent apertures in the dome shaped front of the container is located at the bottom of said container to serve as a drain for the drainage of moisture therefrom.

References Cited in the file of this patent

UNITED STATES PATENTS

| | | |
|---|---|---|
| D. 119,206 | Sandejas | Feb. 27, 1940 |
| 1,900,035 | Beck | Mar. 7, 1933 |
| 1,993,144 | Kasdan | Mar. 5, 1935 |
| 2,214,993 | De Witt | Sept. 17, 1940 |
| 2,501,425 | Valentine | Mar. 21, 1950 |
| 2,540,340 | Lin'blade | Feb. 6, 1951 |
| 2,596,214 | Corkran | May 13, 1952 |

FOREIGN PATENTS

| | | |
|---|---|---|
| 294,298 | Great Britain | July 26, 1928 |